United States Patent
Janakiraman et al.

(10) Patent No.: US 11,050,377 B2
(45) Date of Patent: Jun. 29, 2021

(54) SYSTEMS AND METHODS FOR MANAGING DRIVE PARAMETERS AFTER MAINTENANCE

(71) Applicant: Schlumberger Technology Corporation, Sugar Land, TX (US)

(72) Inventors: Shyam Janakiraman, Houston, TX (US); Ramakrishna Madhireddy, Houston, TX (US); Franz Carstens, Houston, TX (US); Seetharam Kothuru, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 98 days.

(21) Appl. No.: 16/174,989

(22) Filed: Oct. 30, 2018

(65) Prior Publication Data
US 2019/0131905 A1   May 2, 2019

Related U.S. Application Data

(60) Provisional application No. 62/578,981, filed on Oct. 30, 2017.

(51) Int. Cl.
*H02P 23/14* (2006.01)
*G05B 19/05* (2006.01)
*G05B 13/02* (2006.01)

(52) U.S. Cl.
CPC ............ *H02P 23/14* (2013.01); *G05B 13/024* (2013.01); *G05B 19/05* (2013.01); *G05B 2219/1135* (2013.01); *G05B 2219/14045* (2013.01); *G05B 2219/42152* (2013.01)

(58) Field of Classification Search
CPC ....... H02P 23/14; G05B 13/024; G05B 19/05; G05B 2219/42152; G05B 2219/14045; G05B 2219/1135
See application file for complete search history.

(56) References Cited

U.S. PATENT DOCUMENTS

| | | | |
|---|---|---|---|
| 4,482,857 | A | 11/1984 | Porche et al. |
| 5,950,953 | A | 9/1999 | Baugh et al. |
| 6,639,331 | B2 | 10/2003 | Schultz |
| 6,812,811 | B2 | 11/2004 | Robison et al. |
| 6,913,097 | B1 | 7/2005 | Orr et al. |

(Continued)

FOREIGN PATENT DOCUMENTS

| | | |
|---|---|---|
| CN | 106786786 A | 5/2017 |
| WO | 2017139631 A1 | 8/2017 |

(Continued)

*Primary Examiner* — Mohammad Ali
*Assistant Examiner* — Sheela S Rao
(74) *Attorney, Agent, or Firm* — Jeffrey D. Frantz

(57) ABSTRACT

Systems and methods for operating a motor according to parameters provided by an autotuning component if available are described. A controller can be coupled to a drive which operates a motor for executing a task that can be related to a drilling operation for oil and gas. The controller stores initial parameters and checks for new parameters provided by the autotuning component which are stored on the drive after the autotuning component autotunes the motor. If there are new parameters, they are given priority over the initial parameters.

19 Claims, 3 Drawing Sheets

(56) References Cited

U.S. PATENT DOCUMENTS

| | | |
|---|---|---|
| 7,038,332 B2 | 5/2006 | Robison et al. |
| 7,137,586 B2 | 11/2006 | Talen |
| 7,210,647 B2 | 5/2007 | Dion |
| 7,447,051 B2 | 11/2008 | Masino et al. |
| 7,717,193 B2 | 5/2010 | Egilsson et al. |
| 7,819,209 B1 | 10/2010 | Bezner |
| 7,854,636 B2 | 12/2010 | Gilliam |
| 8,061,644 B1 | 11/2011 | Dion |
| 8,219,258 B1 | 7/2012 | Almeida et al. |
| 8,250,816 B2 | 8/2012 | Donnally et al. |
| 8,446,037 B2 | 5/2013 | Williams |
| 8,519,565 B2 | 8/2013 | Dozier et al. |
| 8,604,639 B2 | 12/2013 | Hopwood |
| 8,798,802 B2 | 8/2014 | Almeida et al. |
| 9,059,587 B2 | 6/2015 | Williams |
| 9,065,300 B2 | 6/2015 | Williams |
| 9,197,071 B2 | 11/2015 | Williams |
| 9,206,658 B1 | 12/2015 | Dion |
| 9,212,499 B1 | 12/2015 | Maurer |
| 9,240,687 B2 | 1/2016 | Carralero et al. |
| 9,450,433 B2 | 9/2016 | Di Cristofaro |
| 9,528,697 B2 | 12/2016 | Sonnervig et al. |
| 9,531,204 B2 | 12/2016 | Di Cristofaro |
| 9,535,410 B2 | 1/2017 | Di Cristofaro |
| 9,537,315 B2 | 1/2017 | Kuttel et al. |
| 9,543,748 B2 | 1/2017 | Andersen et al. |
| 9,644,431 B2 | 5/2017 | Myers et al. |
| 9,670,767 B2 | 6/2017 | Hernandez et al. |
| 9,706,185 B2 | 7/2017 | Ellis |
| 9,726,003 B2 | 8/2017 | Pettapiece et al. |
| 9,732,604 B2 | 8/2017 | Haines et al. |
| 9,734,525 B2 | 8/2017 | Lunenfeld |
| 9,739,141 B2 | 8/2017 | Zeng et al. |
| 9,749,598 B2 | 8/2017 | Richardson et al. |
| 9,749,717 B2 | 8/2017 | White et al. |
| 9,759,025 B2 | 9/2017 | Vavik |
| 9,766,364 B2 | 9/2017 | Hickman |
| 9,777,570 B2 | 10/2017 | Braisher et al. |
| 9,784,097 B2 | 10/2017 | Dugas |
| 9,797,234 B1 | 10/2017 | Forstner et al. |
| 9,803,461 B2 | 10/2017 | Boone |
| 9,806,530 B2 | 10/2017 | Martinez |
| 9,810,055 B2 | 11/2017 | Hall |
| 9,819,292 B2 | 11/2017 | Thatcher et al. |
| 9,850,712 B2 | 12/2017 | Sugiura |
| 9,910,180 B2 | 3/2018 | Donderici et al. |
| 9,915,128 B2 | 3/2018 | Hunter |
| 9,938,780 B2 | 4/2018 | Begnaud |
| 10,017,993 B2 | 7/2018 | Hu et al. |
| 10,027,128 B2 | 7/2018 | Muller |
| 10,151,178 B2 | 12/2018 | Stephenson et al. |
| 2002/0040250 A1* | 4/2002 | Gaikwad ............... G05B 11/42 700/37 |
| 2008/0201054 A1* | 8/2008 | Grichnik ............... B60W 40/00 701/102 |
| 2008/0203734 A1 | 8/2008 | Grimes et al. |
| 2009/0195074 A1 | 8/2009 | Buiel |
| 2009/0312885 A1 | 12/2009 | Buiel |
| 2011/0241447 A1* | 10/2011 | Ando ............... G05B 19/4063 307/326 |
| 2013/0207590 A1* | 8/2013 | Yanagihara ............ H02P 23/00 318/807 |
| 2014/0121789 A1* | 5/2014 | Brandes ............... G05B 23/027 700/80 |
| 2014/0350744 A1 | 11/2014 | Almeida, Jr. et al. |
| 2015/0372492 A1 | 12/2015 | Kuttel et al. |
| 2016/0020720 A1* | 1/2016 | Green ................ H02P 27/047 318/807 |
| 2016/0036367 A1 | 2/2016 | McCall et al. |
| 2016/0145947 A1 | 5/2016 | Myers et al. |
| 2016/0190963 A1 | 6/2016 | Thatcher et al. |
| 2017/0067303 A1 | 3/2017 | Thiemann et al. |
| 2017/0077705 A1 | 3/2017 | Kuttel et al. |
| 2017/0123404 A1* | 5/2017 | Nakanishi .......... G05B 19/4155 |
| 2017/0153611 A1* | 6/2017 | Fujii ................... G05B 13/042 |
| 2017/0175447 A1 | 6/2017 | Gharib et al. |
| 2017/0184754 A1 | 6/2017 | Rozenblit et al. |
| 2017/0204690 A1 | 7/2017 | Hess et al. |
| 2017/0211338 A1 | 7/2017 | Myers et al. |
| 2017/0218745 A1 | 8/2017 | Erdos et al. |
| 2017/0229869 A1 | 8/2017 | Boone et al. |
| 2017/0241252 A1 | 8/2017 | Hernandez et al. |
| 2017/0270768 A1 | 9/2017 | Valleru |
| 2017/0298722 A1 | 10/2017 | Pettapiece et al. |
| 2017/0314369 A1 | 11/2017 | Rosano et al. |
| 2017/0321503 A1 | 11/2017 | Lane |
| 2017/0328193 A1 | 11/2017 | Holt et al. |
| 2017/0328196 A1 | 11/2017 | Shi et al. |
| 2017/0328197 A1 | 11/2017 | Shi et al. |
| 2017/0335683 A1 | 11/2017 | Pool |
| 2017/0342808 A1 | 11/2017 | Dykstra et al. |
| 2017/0370190 A1 | 12/2017 | Bagnaro |
| 2017/0370204 A1 | 12/2017 | Dahl |
| 2018/0012384 A1 | 1/2018 | Marland et al. |
| 2018/0023354 A1 | 1/2018 | Dion |
| 2018/0023381 A1 | 1/2018 | Xue et al. |
| 2018/0035566 A1 | 2/2018 | Held et al. |
| 2018/0066506 A1 | 3/2018 | Boone |
| 2018/0066513 A1 | 3/2018 | Sugiura et al. |
| 2018/0080286 A1 | 3/2018 | Begnaud |
| 2018/0123384 A1 | 5/2018 | Foo |
| 2018/0175626 A1 | 6/2018 | Gerdes et al. |
| 2019/0048666 A1 | 2/2019 | Orban et al. |
| 2019/0048667 A1 | 2/2019 | Krippner et al. |
| 2019/0071828 A1 | 3/2019 | Orban |
| 2019/0115758 A1 | 4/2019 | Orban et al. |

FOREIGN PATENT DOCUMENTS

| | | |
|---|---|---|
| WO | 2017192814 A2 | 11/2017 |
| WO | 2017217905 A1 | 12/2017 |
| WO | 2018201118 A1 | 11/2018 |
| WO | 2018204293 A1 | 11/2018 |
| WO | 2018213925 A1 | 11/2018 |

\* cited by examiner

SYSTEMS AND METHODS FOR MANAGING DRIVE PARAMETERS AFTER MAINTENANCE

CROSS REFERENCE TO RELATED APPLICATIONS

This application claims priority to U.S. Provisional Patent Application No. 62/578,981 entitled SYSTEMS AND METHODS FOR MANAGING DRIVE'S PARAMETERS AFTER MAINTENANCE filed on Oct. 30, 2017, which is incorporated herein by reference in its entirety.

BACKGROUND

Drilling in the oil and gas industry is a complex and power-intensive endeavor. Many drilling operations employ power supplies coupled to variable frequency drives (VFDs) which provide power to motors that are used to provide the needed power. Many drilling operations use many motors and many VFDs, each of which can have slightly different parameters and operating procedures. Managing the several different components for a complex drilling operation is a challenge to many drilling operations. When parts are repaired, replaced, or otherwise subject to maintenance, some of these parameters change posing additional challenges.

SUMMARY

Embodiments of the present disclosure are directed to a system including a controller, a variable frequency drive (VFD) operably coupled to the controller and configured to be controlled by the controller, and a motor operably coupled to the VFD and configured to be operated by the VFD. The system also includes an autotuner configured to tune the motor. The controller is configured to receive parameters that determine operation of the VFD and motor, the parameters being grouped into sets of parameters, and the controller is configured to store a first set of parameters. When the autotuner tunes the motor, a second set of parameters is generated, and the controller is configured to selectively apply the first set of parameters and the second set of parameters according to a predetermined priority.

Further embodiments of the present disclosure are directed to a system for controlling motors, the system including a programmable logic controller (PLC), a motor operably coupled to the PLC and configured to receive instructions from the PLC, and a database operably coupled to the PLC, the database being configured to store parameters for operation of the motor. The system also includes an autotuner configured to tune the motor and to generate a new set of parameters, wherein the new set of parameters is stored in the database.

Further embodiments of the present disclosure are directed to a method of operating a plurality of motors. The method includes operating a programmable logic controller (PLC) to control a motor, storing a plurality of parameters for operation of the motor in a database, and accessing the motor by an autotuner and generating a new set of parameters for operation of the motor. The method also includes selecting between the plurality of parameters and the new set of parameters, and operating the PLC to control the motor based on the selected parameters.

DETAILED DESCRIPTION

Figure 1:
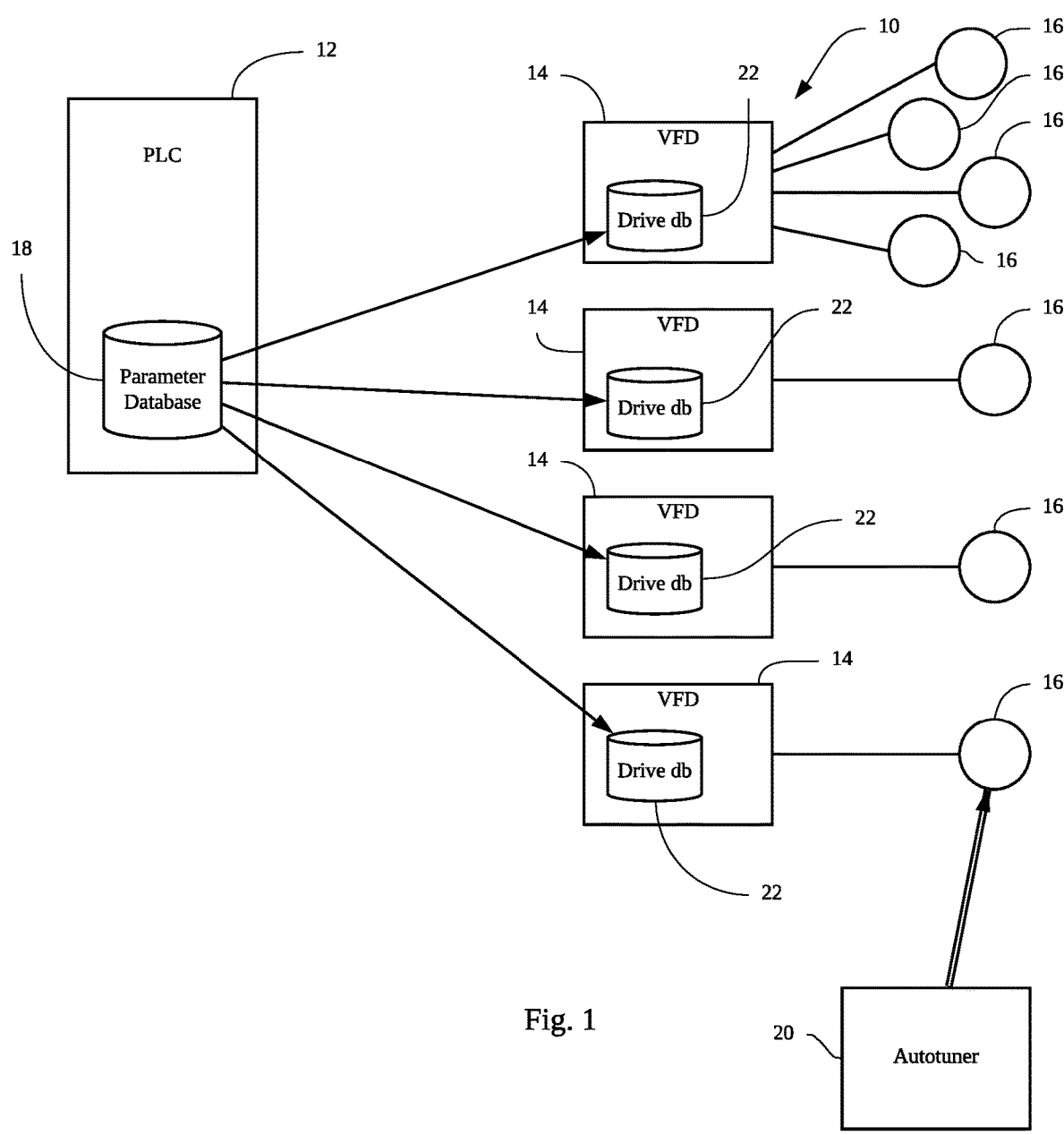
FIG. 1 is a schematic illustration of a system for managing VFDs and motors for a drilling operation according to embodiments of the present disclosure.

FIG. 1 is a schematic illustration of a system 10 for managing VFDs and motors for a drilling operation according to embodiments of the present disclosure. The system 10 includes a controller 12 which can be a programmable logic controller (PLC) or another suitable controller. There are illustrated four VFDs 14, each of which can be identical or different as needed in a given configuration. Each VFD 14 is coupled to a motor 16 or multiple VFDs 14 considered as a single VFD 14 coupled to a single/multiple motor or motors. The motor 16 can comprise one or multiple motors and for brevity throughout the motor 16 is referred to as a single motor but it is to be appreciated that there can by multiple motors 16 as shown in FIG. 1. The motors 16 are operated according to parameters stored in the controller 12 which instructs the VFDs 14 how to operate the motors 16. The controller 12 includes a parameter database 18 which contains data such as slip frequency, no load current, resistance, inductance, saturation efficiencies, and many others that are used to control the motors 16. The motors 16 can be top drive motors for a drilling operation or any other suitable type of motor as needed in a given drilling operation.

When the motors 16 and VFDs 14 are initially built, the parameters stored on the controller 12 are accurate and tuned to the motors 16. From time to time, the motors 16 require maintenance, support, repair, replacement, or another form of alteration. The system 10 can include an autotuner 20 that can tune the motors 16, which can alter the characteristics of the motors 16 such that the parameters stored on the controller 12 are rendered inaccurate. If the parameters are not accurate problems can arise in controlling the VFDs 14 or the motors 16 or both. In some embodiments, the VFDs 14 include a drive database 22 configured to store parameters including but not limited to slip frequency, no load current, resistance, inductance, and saturation efficiencies. The drive databases 22 are configured to store these updated parameters which will be more accurate than the previously stored parameters which are still held on the controller 12.

The autotuner 20 can be a human operator, a machine operator, a remotely operated device, a human-machine interface (HMI) or any other component capable of tuning the motors 16. The autotuner 20 runs the VFD 14 and motor 16 in various combinations to determine parameters for a motor model. The motor model determines how precisely the VFD 14 controls the motor 16. This can be an open loop vector or a closed loop vector control or a V/F control. The autotuner can be a program or software application that could reside in the controller or could be a stand-alone controller. When one of these components triggers the autotuner (whether program, software, or residing in hardware such as a HMI or a remotely-operated device), then the autotuner can send commands to the VFD 14. The commands could be in any suitable protocol such as PROFIBUS, or PROFINET, or any other field bus protocol. The VFD 14 can then run the motor 16 and update the database 22 on the VFD 14 and also in the parameter database 18 on the controller 12.

In some embodiments the controller 12 can be programmed to use the parameters stored in the parameter database 18 on the controller 12, but if there are parameters stored on the drive database 22, the controller 12 uses the parameters from the drive database 22. The drive database 22 can be given a priority over the parameter database 18, or vice versa. In some embodiments the parameters include a time stamp and the controller 12 can be configured to compare the timestamp and to use the most recently input parameters. The autotuner 20 can inform the controller of the event of an autotuning which will also indicate there are new parameters on the drive database 22 which should be given priority over the parameters stored in the controller 12. The controller 12 can be configured to check for an autotuning event which will leave new parameters on the drive database 22, and if so to use these parameters. In some embodiments the autotuner 20 will update some, but not all, of the parameters in which case the controller 12 is configured to use the new parameters that are available on the drive database 22, and for the missing parameters, the controller 12 will use the parameters stored on the parameter database 18.

The controller 12 can be configured to perform a "sanity check" on the parameters to ensure they are within reasonable boundaries. It can also check against existing parameters in the database. If the difference between old and new parameters are less than a certain threshold, the controller can decide to keep old parameters because the cost of changing is greater than the benefit of updating the parameters.

In some embodiments there are multiple VFDs and multiple motors. When an autotuner acts on one motor, the parameters generated by that event can be applied to other motors. In some embodiments the parameters can be selectively applied to certain motors based on a similarity with the first motor. An operator can manually apply the parameters from an autotuning to any number of motors at the discretion of the operator. The operator can also set the newly-generated set of parameters as the default set of parameters for all motors.

Figure 2:
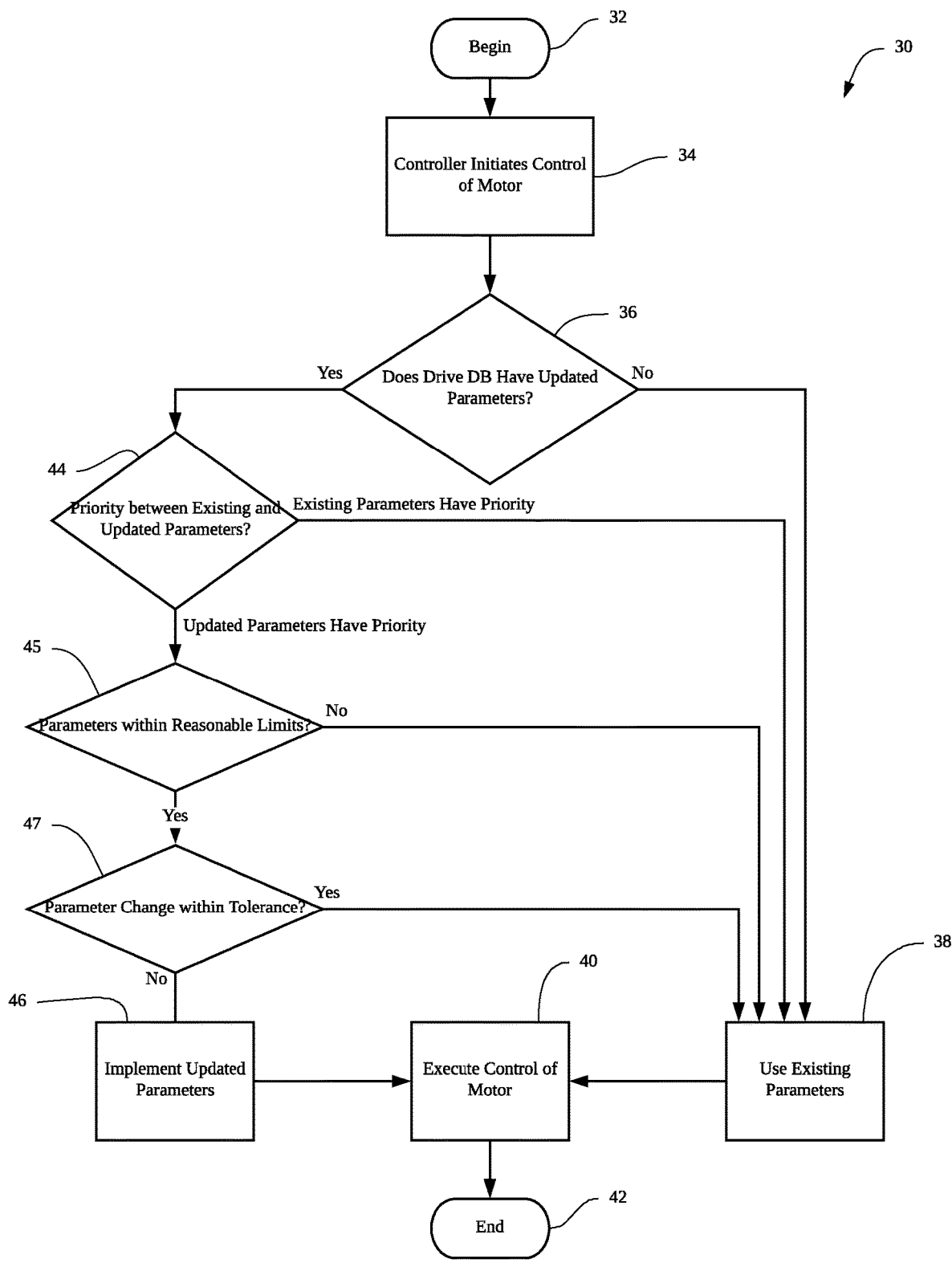
FIG. 2 is a flowchart block diagram illustrating systems and methods according to the present disclosure.

FIG. 2 is a flowchart block diagram illustrating systems and methods 30 according to the present disclosure. The method 30 begins at 32 which can represent any initiation of the motor/VFD combination and is not necessarily the first time these components are operated. At 34 the controller initiates control of the VFD and/or motor. The initiation can be any form of electrical control signal through which mechanism the controller instructs the VFD and motor to operate. At 36 the method includes a check for updated parameters. The updated parameters can be stored on the VFD, on the motor, or on another component in the system. The method can include receiving parameters from an autotuner or another remote device which is described in greater detail below with reference to FIG. 3. If there are no updated parameters, the controller continues at 38 and uses existing parameters which may be stored on the controller. At 40 the instruction is passed to the motor and the action is executed. The method 30 can end at 42 and return to a ready state for a new instruction or operation.

Returning to 36, if there are updated parameters available, the method 30 can include a priority check between parameters at 44. The priority check at 44 can be according to a time stamp, meaning that the controller can be instructed to select parameters according to their age. For example, the controller can select the newest parameters. The parameters can be updated by an autotuner, and if the autotuning takes place after the initial setup the newer parameters are more recent and therefore it can be assumed they are more accurate and therefore should be used. In some embodiments, however, the controller can be instructed to use other parameters even after an autotuning updates parameters and stores parameters on the VFD. For example, if an autotuning malfunctions or for any other suitable reason the parameters on the controller are preferred over the newly-created parameters from the autotuning, the controller can be instructed to use the higher priority parameters. In another example, if an operator has parameters which are desired to be used, even if an autotuner initiates new priorities which have a more recent timestamp, the parameters with the higher priority can be chosen. The priority can also be based on certain parameters in relation to the motor and/or other equipment. For example, in some embodiments priority can be given to parameters that are within a safe operating band. If an autotuner sets parameters that are outside of a safe operating band, these parameters should not be used because of the potential damage they can cause. The priority can be set to prevent such a parameter to be used.

If existing parameters have priority (the option to the right of the decision block 44), control passes to use existing parameters at 38. If, however, the updated parameters have priority, the method continues at 45 with a reasonability check. It is possible for parameters to be outside of a desired, safe, efficient, or sustainable band (either high or low). Any suitable band can be set at any time and can be as arbitrarily high or low as desired. At 45 the parameters are checked to be sure they are reasonable. In some embodiments this reasonability check can be a simple calculation designed to eliminate an outlier or an unexpectedly high or low value. If the parameters are not within limits, control passes to 38 and existing parameters are used and the new parameters can be ignored, deleted, or unused. The next time new parameters are generated by an autotuner these parameters will be overridden.

If the parameters are within reasonable limits, at 47 yet another check can be performed to ensure that the difference between the updated parameters and the existing parameters is great enough to warrant the cost to make the change. The cost can be in terms of the time it takes to implement the new parameters, the likelihood of error caused by making a change, the chance that new parameters will cause an unforeseen problem, or any other unexpected eventuality. If the new parameters are similar enough to the old parameters, implementing the new parameters is not worth the time and effort and risk it would take to do so. The tolerance for this check will depend on a given situation. In some embodiments the tolerance is 1%. If the parameter change is not within the tolerance (meaning that the difference between existing and updated parameters is small enough) the existing parameters are used at 38. If, however, the new parameters are different enough from the existing parameters such that the parameter change is not within the tolerance, control proceeds to 46 at which point the updated parameters are updated. At 40 the method includes executing control of the motor according to the parameters (existing or updated) that have been selected through this method. At 42 the method ends. It is to be appreciated that the priority check 44, the reasonability check 45, and tolerance check 47 can be executed in any order.

In some embodiments the autotuning updates some but not all of the parameters for the operation. The priority check at 44 can be used to select the available parameters from the autotuning and for those not supplied by the autotuner to use parameters on the controller. For example, an autotuning operation can update parameters such as slip frequency, no load current, but not resistance or inductance. The controller would see the new parameters of slip frequency and no load current, but will not see new parameters for resistance or inductance. In this case, the controller will use the new parameters for slip frequency and no load current, but will use parameters on the controller for resistance and inductance.

Figure 3:
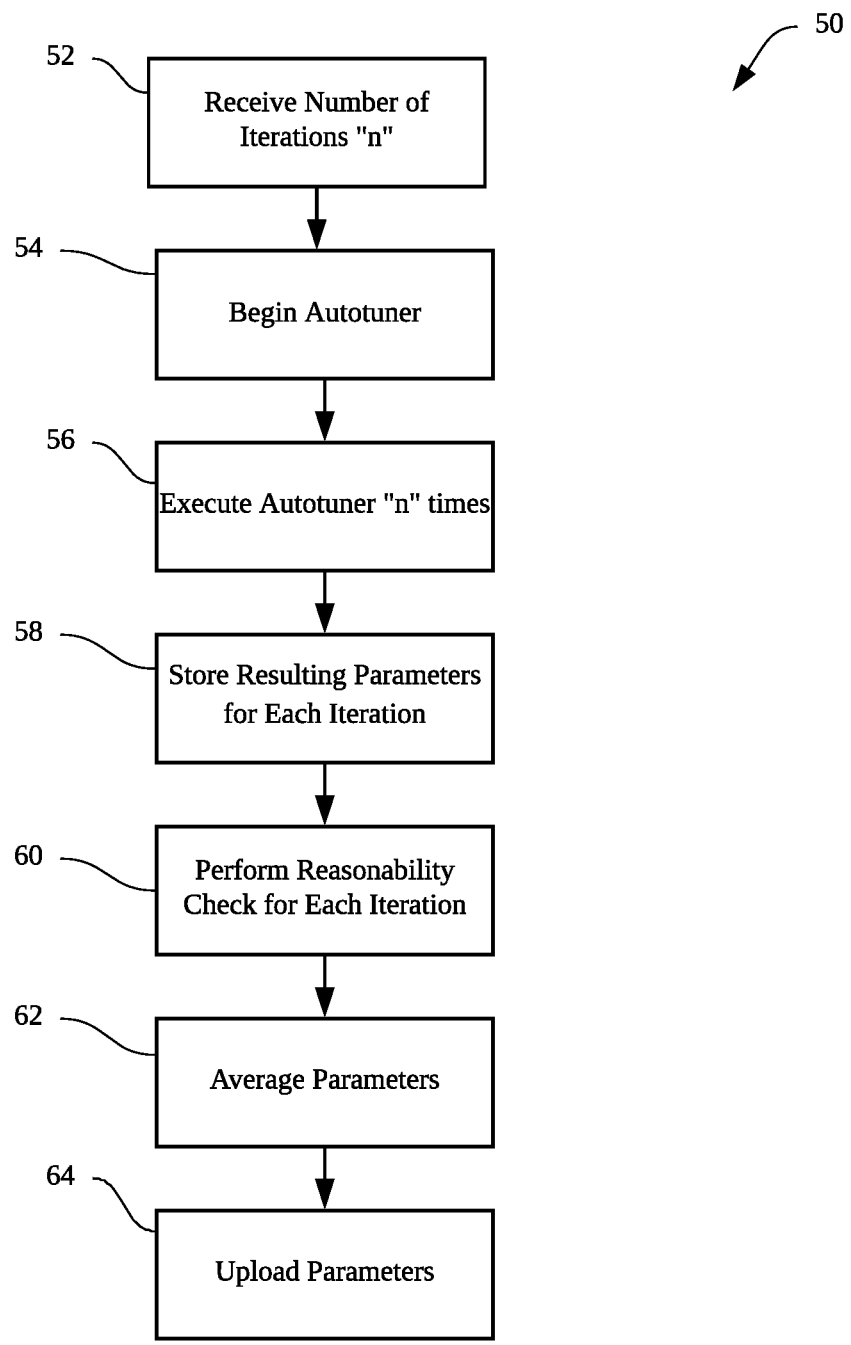
FIG. 3 is a flowchart block diagram showing a method for averaging parameters according to embodiments of the present disclosure.

FIG. 3 is a flowchart block diagram showing a method 50 for averaging parameters according to embodiments of the present disclosure. The results of the execution of this method 50 can be the updated parameters as described with respect to FIG. 2. At 52 the method includes receiving a number of iterations that are desired. This can be received from an operator at a remote station or from an algorithm from a local or remote station. In some embodiments the number of iteration can be 3, 4, 5, etc. or any suitable number of iterations. Some operations are more volatile than others in which cases a higher number of iterations are desired to avoid undue influence on the parameters from a single, unreasonably high or low value. At 54 the autotuner begins. At 56 the autotuner executes n times according to the number of iterations received at 52. At 58 the results for each iteration are stored in a database. The parameters can be a string of numbers of any suitable size depending on the application. At 60 a reasonability check is performed on each parameter set. The threshold of reasonability for the parameters can be arbitrarily set. An unreasonable number can be removed from the data set. At 62 the parameters can be averaged. The average can be on a per-number basis. For example, a parameter set may include numbers A, B, C, and D. For multiple parameter sets, each can include an A, B, C, and D. Parameter set 1 can have A1, B1, C1, and D1; set 2 can have A2, B2, C2, and D2, etc. The average parameters can be: Avg=(A1+A2+A3)/3; (B1+B2+B3)/3; (C1+C2+C3)/3. The resulting averaged parameter set can be delivered to the drive as described above with respect to FIG. 2.

One advantage of using an averaged parameter set is to avoid unexpected values that can be caused by various conditions such as the engine warming up, aberrations in the fuel, a failing component, or any other unexpected eventuality. The likelihood of a bad parameter value are therefore greatly reduced.

Other embodiments of the present disclosure will become apparent to those of ordinary skill in the art from the specification and figures. Certain examples and explanations are given herein to describe the subject matter of the present disclosure and are not given in a limiting way. For example, the parameters of slip frequency, no load current, resistance, inductance, and saturation efficiencies are given; however, it is to be understood that a different motor and/or VFD configuration could include different parameters than these listed without departing from the scope of the present disclosure.

The invention claimed is:

1. A system, comprising:
a controller;
a variable frequency drive (VFD) operably coupled to the controller and configured to be controlled by the controller;
a motor operably coupled to the VFD and configured to be operated by the VFD; and
an autotuner configured to tune the motor;
wherein:
the controller is configured to receive parameters that determine operation of the VFD and motor, the parameters being grouped into sets of parameters;
the controller is configured to store a first set of parameters;
when the autotuner tunes the motor, a second set of parameters is generated;
the controller is configured to selectively apply the first set of parameters and the second set of parameters according to a predetermined priority; and
the controller is configured to compare the first and second parameters to determine a difference between the first and second sets of parameters, and wherein if the difference between the first and second sets of parameters is less than the predetermined threshold the second set of parameters is not used.

2. The system of claim 1 wherein the predetermined priority is based on a time the parameters were created, wherein a later-created set of parameters has priority.

3. The system of claim 1 wherein the controller is configured to compare the parameters against a predetermined limit, and wherein the predetermined priority is based on whether or not parameters exceed the predetermined limit.

4. The system of claim 1 wherein the autotuner comprises at least one of a human operator, a machine operator, a remotely operated device, or a human-machine interface (HMI).

5. The system of claim 1 wherein the predetermined priority comprises a manually-input priority.

6. The system of claim 1 wherein the parameters comprise at least one of slip frequency, no load current, resistance, inductance, and saturation efficiencies.

7. The system of claim 1 wherein the autotuner is configured to autotune the motor a plurality of times, generating a plurality of parameter sets, and wherein the second set of parameters comprises an average of the plurality of parameter sets.

8. The system of claim 7 wherein the average comprises an average of corresponding numbers in the set of parameters.

9. A system for controlling motors, the system comprising:
a programmable logic controller (PLC) configured to store a set of parameters;
a motor operably coupled to the PLC and configured to receive instructions from the PLC;
a database operably coupled to the PLC, the database being configured to store parameters for operation of the motor; and
an autotuner configured to tune the motor and to generate a new set of parameters, wherein the new set of parameters is stored in the database,
wherein the PLC is further configured to selectively apply the set of parameters and the new set of parameters according to a predetermined priority, and
wherein the PLC is further configured to compare the set of parameters and the new set of parameters to determine a difference between the set of parameters and the new set of parameters, and wherein if the difference between the set of parameters and the new set of parameters is less than a predetermined threshold the new set of parameters is not used.

10. The system of claim 9 wherein the database is configured to store two or more sets of parameters.

11. The system of claim 10 wherein the PLC is configured to select a set of parameters from the two or more sets of parameters stored in the database.

12. The system of claim 11 wherein the PLC is configured select a set of parameters having a highest priority.

13. The system of claim 12 wherein the priority is proportional to how recent the parameters are.

14. The system of claim 12 wherein the priority is manually input to the database.

15. The system of claim 9 wherein the parameters comprise at least one of slip frequency, no load current, resistance, inductance, and saturation efficiencies.

16. A method of operating a plurality of motors, the method comprising:

operating a programmable logic controller (PLC) to control a motor;

storing a plurality of parameters for operation of the motor in a database;

accessing the motor by an autotuner and generating a new set of parameters for operation of the motor;

selecting between the plurality of parameters and the new set of parameters; and operating the PLC to control the motor based on the selected parameters, wherein the PLC is configured to compare the plurality of parameters and the new set of parameters to determine a difference between the plurality of parameters and the new set of parameters, and wherein if the difference between the plurality of parameters and the new set of parameters is less than a predetermined threshold the new set of parameters is not used.

17. The method of claim 16 further comprising, if the difference between the plurality of parameters and the new set of parameters is greater than a predetermined threshold, comparing the new set of parameters against predetermined upper and lower bounds before implementing the new set of parameters.

18. The method of claim 16 wherein generating the new set of parameters comprises running the autotuner two or more times and taking an average of the resulting parameters as the new set of parameters.

19. The method of claim 18 further comprising comparing each parameter against a predetermined upper and lower bound before taking the average.

\* \* \* \* \*